RECORDING AND/OR PLAY-BACK APPARATUS FOR TAPE-SHAPED RECORD CARRIERS WITH VARIOUS OPERATING CONDITIONS

Filed June 21, 1963 6 Sheets-Sheet 1

INVENTORS
FRIEDRICH LAA
FREIDRICH LOUZIL
ARNE APREL
BY Frank R. [signature]
AGENT INVENTORS
FRIEDRICH LAA
BY FRIEDRICH LOUZIL
ARNE APPEL
Frank R. Jeffer
AGENT

INVENTORS
FRIEDRICH LAA
FRIEDRICH LOUZIL
ARNE APPEL
BY
AGENT

INVENTORS
FRIEDRICH LAA
FRIEDRICH LOUZIL
ARNE APPEL
BY Frank R. Jufani
AGENT

INVENTORS
FRIEDRICH LAA
BY FRIEDRICH LOUZIL
ARNE APPEL
Frank R. Jeufani
AGENT

INVENTORS
FRIEDRICH LAA
BY FRIEDRICH LOUZIL
ARNE APPEL
Frank R. Jifani
AGENT 3,244,018
Patented Apr. 5, 1966

3,244,018

RECORDING AND/OR PLAY-BACK APPARATUS FOR TAPE-SHAPED RECORD CARRIERS WITH VARIOUS OPERATING CONDITIONS

Friedrich Laa, Friedrich Louzil, and Arne Appel, Vienna, Austria, assignors to North America Philips Company Inc., New York, N.Y., a corporation of Delaware Filed June 21, 1963, Ser. No. 289,504
Claims priority, application Austria, July 4, 1962, A 5,367/62
13 Claims. (Cl. 74—335)

The invention relates to an apparatus for recording and/or play-back for tape-shaped record carriers with various operating conditions, such as, for example, the travel of the record carrier at different scanning speed with the arbitrary switching of the amplifier device to recording or play-back, the fast travel of the record carrier in both directions for rewinding, and the like. In order to reach the desired operating condition, always a displacement of movable component parts of the apparatus is required, for example, pressure rollers, idler wheels, couplings, brakes, etc., have to be actuated or multipolar switches have to be switched. For switching the various operating conditions, often a separate operating member is provided for each operating condition, for example a lever, a key, a switch or the like, by the operation of which the transmission of the displacement force to the component parts to be displaced is effected directly or through transmission members. The displacement force required for the displacement often is very large; also the displacement path cannot be made arbitrarily small. As a result of this, usually very much energy is required for switching the operating conditions.

In the apparatus known so far this energy is supplied in two manners. When operating the switching member, either the energy has to be transmitted by hand by the operator to the member, or the movable component parts are displaced by means of electromagnets, the energy in this case being supplied by the magnetic field and by the current source feeding the electromagnets respectively. Since the displacement path of the operating members cannot be made arbitrarily large, the operation thereof by hand requires the use of great forces which is not only unpleasant for the operator but which also renders a rigid and consequently expensive construction of the operating members necessary. In the case of electromagnetic displacement, the switching member, it is true, is a switch which can be operated with little force, but the electromagnets have to be very strong and they are correspondingly expensive, consequently the cost in the electromagnetic switching of various operating conditions is very high since a separate electromagnet is required for each operating condition.

The object of the present invention is to provide an apparatus having various operating conditions, in which for switching on and off each operating condition a separate operating member is provided by the operation of which a displacement of movable component parts of the apparatus is effected directly or through transmission members which is necessary to obtain the desired operating condition, in which, however, the operating members associated with the individual operating conditions can be switched with little force and the cost of the apparatus is minimized all the same.

According to the invention, an intermediate member is provided which is common for two or more operating conditions and which can be operated from an energy source provided in the apparatus, in which by operating the operating member associated with the desired operating condition, both the energy source becomes operative on the intermediate member, and the intermediate member and the component parts to be displaced or the intermediate member and the transmission members of such component parts are set in a position by a relative movement, the intermediate member transmitting the displacement force supplied by the energy source to the components parts to be displaced while changing its position.

With such a construction of an apparatus it is not only possible to operate the operating members for the operating conditions with a slight force and to keep the cost for building up the apparatus low, it has also appeared that the advantages of the invention are much more extensive. As a matter of fact, in the structural construction of the inventive idea one is not at all restricted to certain details but is quite free. This becomes noticeable in particular if it deals with the construction of remote-controlled apparatus or fully automatic apparatus, for example those in which a switching of various operating conditions occurs automatically in a fixed sequence if only the first operating condition is switched, for example automatic switching from "forward" to "rewind."

As energy source is preferably used the current source required for driving the apparatus which source excites a single electromagnet, to the armature of which the intermediate member is or becomes connected, which armature supplies the displacement force. As energy source may also be used, however, a large mass which rotates during operation of the apparatus, for example the flywheel mass of the capstan of a magnetic recorder.

The intermediate member may be provided in a slidable and/or swingable manner. It is connected to the operating members for switching the operating conditions and, in a preferred embodiment, by means of the intermediate member when operating one of the operating members, first the choice of the operating condition is made and then the energy source becomes operative on the intermediate member so that when sliding and/or swinging the intermediate member the displacing force is transmitted to the movable component parts and transmission members respectively to be displaced.

The intermediate member consists, for example, of a lever which is journalled in a swingable manner and is slidable in its longitudinal direction.

In another embodiment, the intermediate member is a comb which can be swung around its longitudinal axis, the teeth of which comb act upon transmission members cooperating with the component parts to be displaced which members are swingable in the area covered by the teeth of the comb by means of the operating members for switching the operating conditions, in which when operating one of the operating members first the choice of the operating condition is made by swinging the transmission member and then an effective connection is effected between the energy source and the comb, so that on swinging the comb the displacement force is transmitted to the component parts to be displaced.

Particularly effective details and further elaborations will appear from the following description of embodiments according to the attached drawings with reference to which the invention will be explained. However, the invention is not restricted to the structural details of these embodiments.

FIG. 1 shows, partly diagrammatically in plan view, a first embodiment of a device according to the invention in which an intermediate member for the switching of two operating conditions, namely "forward at normal tape speed" and "rewind of the tape," is provided in the form of a lever which is journalled slidably and swingably, the energy being supplied by an electromagnet excited by a current source.

FIGS. 5 to 16 relate to other embodiments of devices according to the invention in which an intermediate member constructed as a comb is used and the displacement energy is supplied by a rotating flywheel mass.

Figure 5:
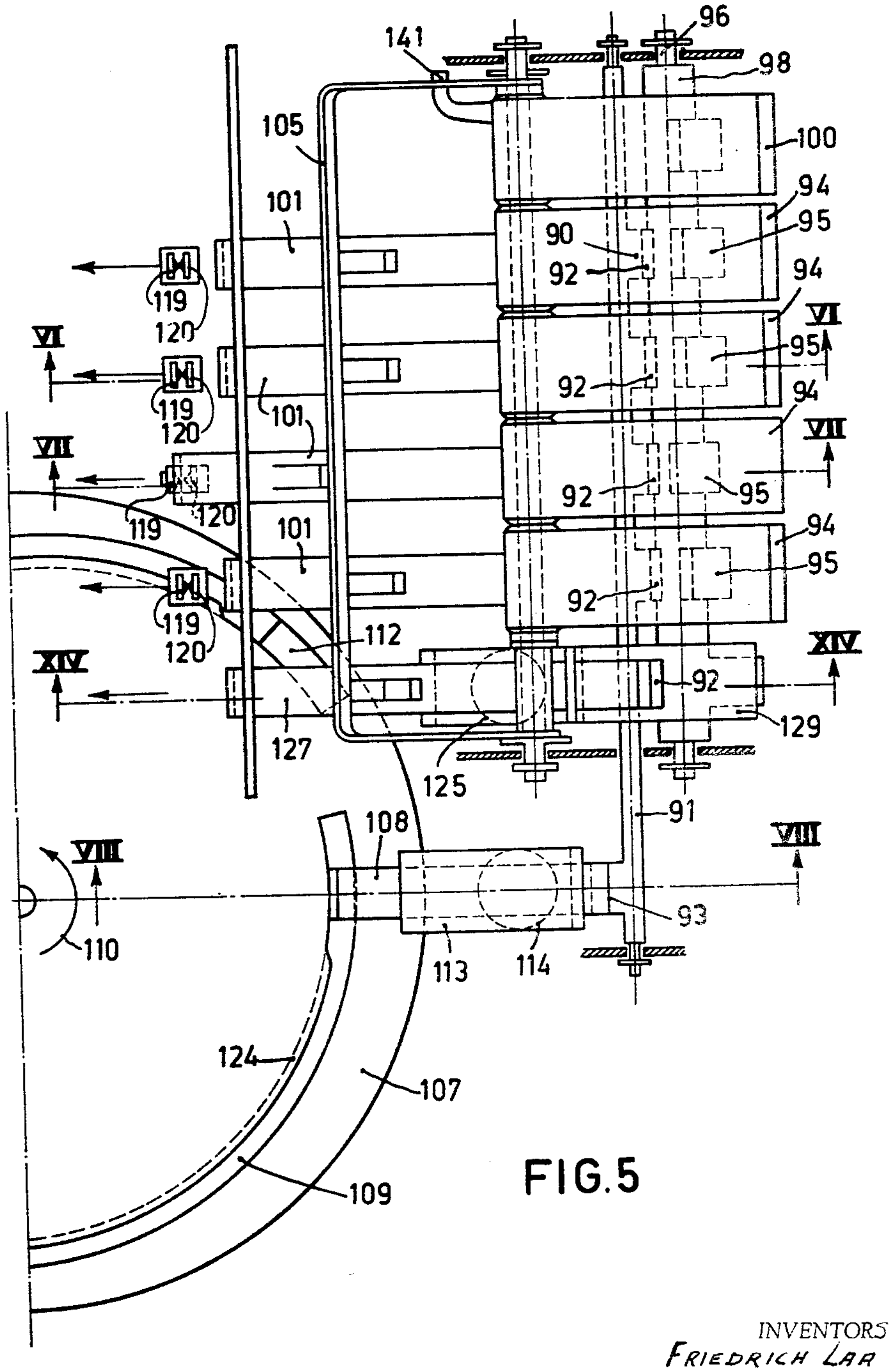

FIG. 5 shows a device in which an auxiliary relay is used to connect the intermediate member to the rotating mass and the operating members consist of keys which snap into engagement with a common holding member.

Figures 6, 7, 8, 9:
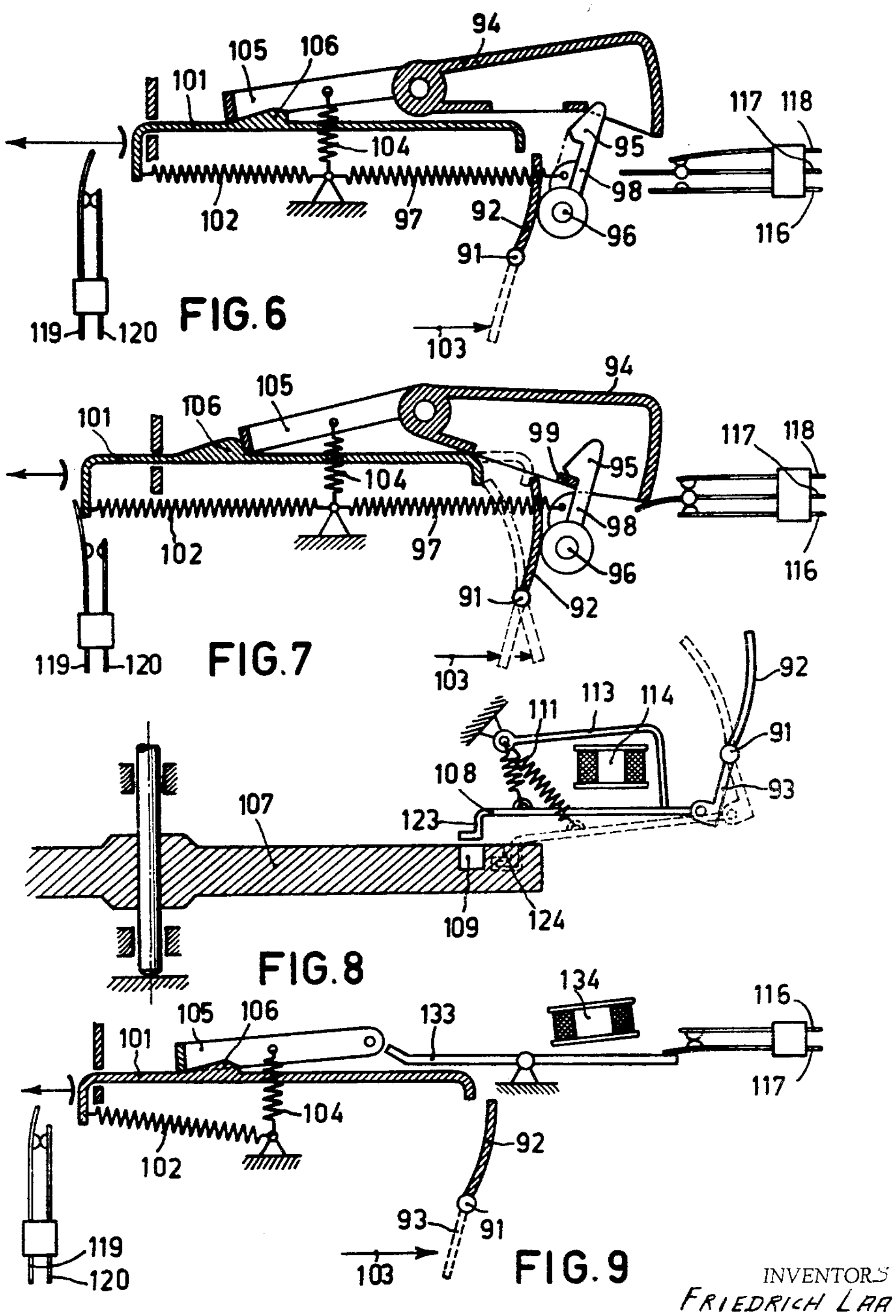

FIGS. 6, 7 and 8 are cross-sectional views of the device shown in FIG. 5 taken along the lines VI—VI, VII—VII and VIII—VIII.

Figures 10, 11, 12, 13:
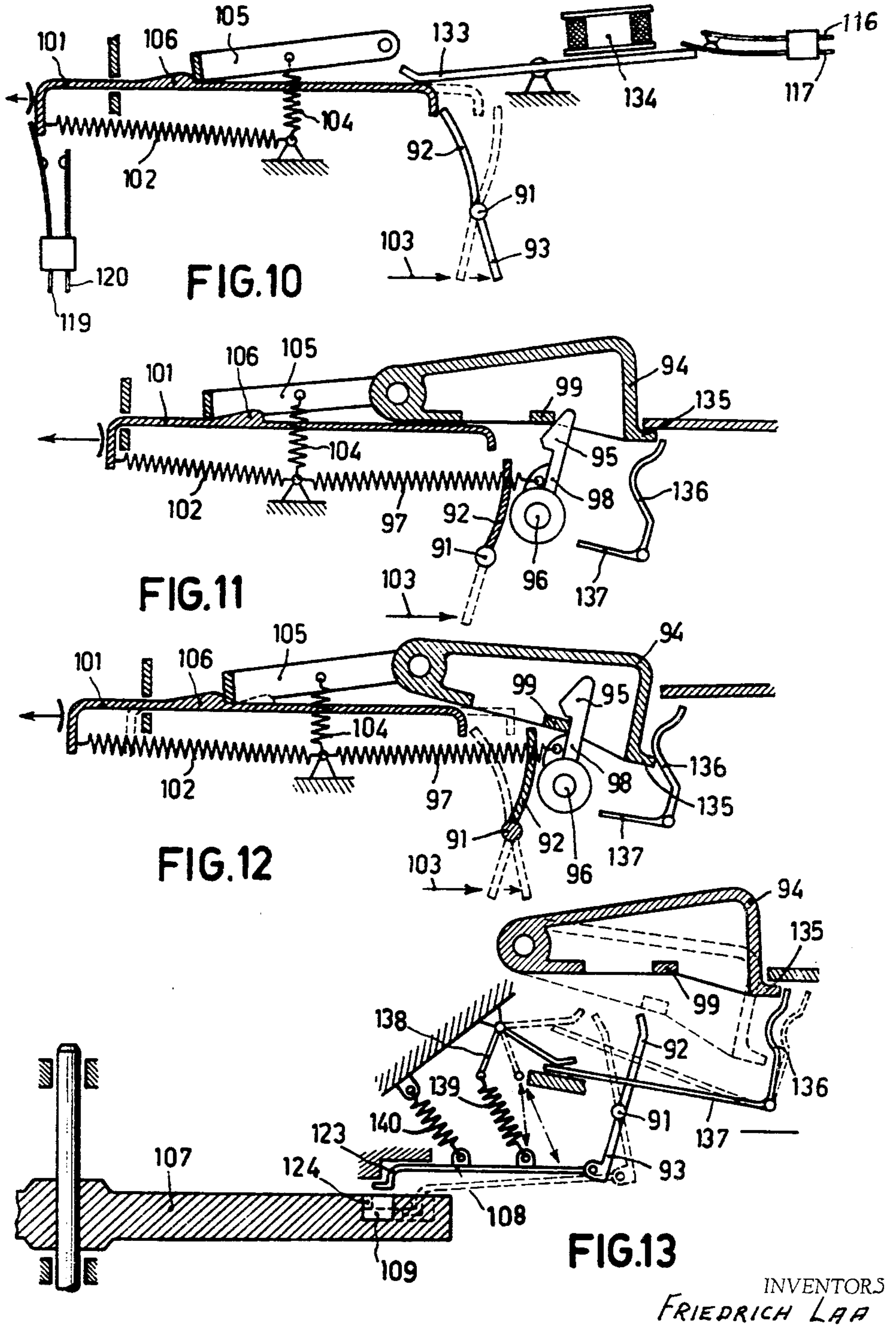

FIGS. 9 and 10 are cross-sectional views of a variation of the device shown in FIG. 5 which is particularly suitable for remote control.

FIGS. 10, 11, 12 and 13 are cross-sectional views of a further variation of the device shown in FIG. 5 in which for the connection of the intermediate member, namely of the comb to the flywheel mass, only purely mechanical switching means are used.

Figure 14:
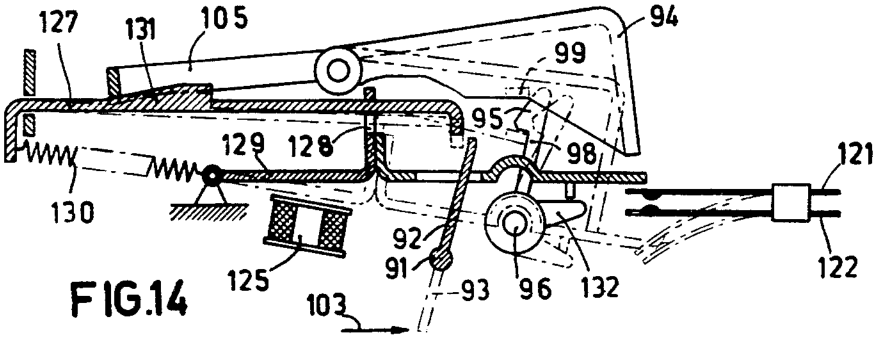

FIG. 14 is a cross-sectional view of the device shown in FIG. 5 taken along the line XIV—XIV and explains an apparatus incorporated in the device for automatically stopping a movement of the record carrier by means of a mark provided thereon.

Figure 15:
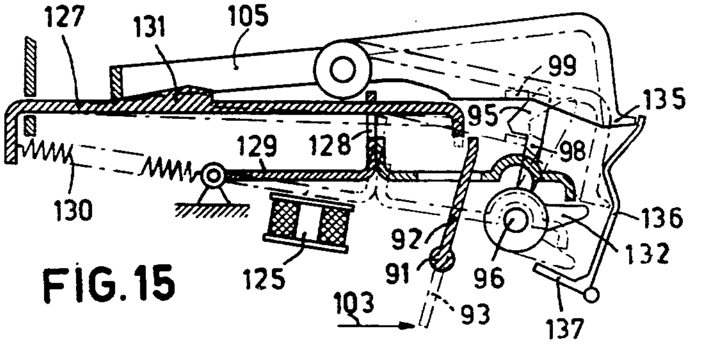

FIG. 15 serves to illustrate an automatic stop member in the device shown in FIGS. 11, 12 and 13.

Figure 16:
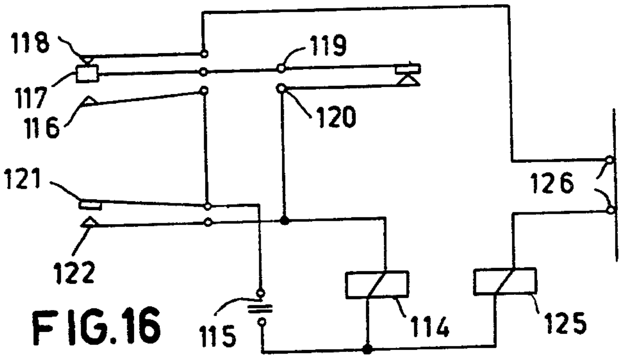

FIG. 16 shows the circuit diagram belonging to the device shown in FIG. 5.

Figure 1:
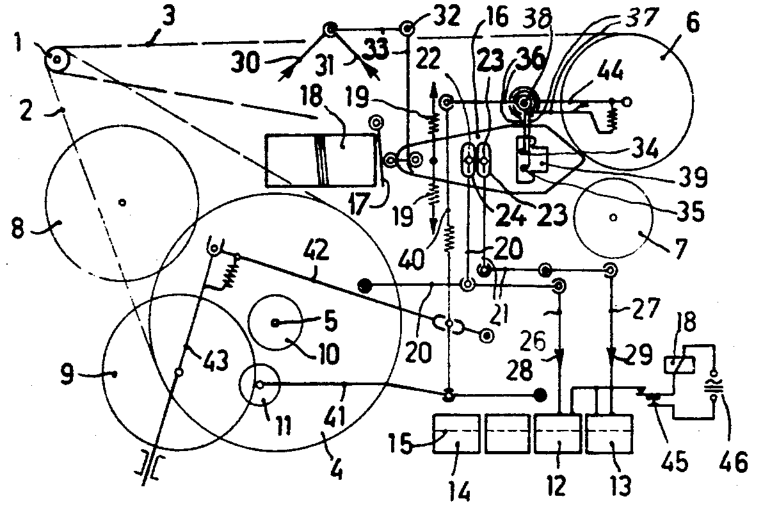

In the apparatus shown in FIG. 1 a motor permanently drives, through a pinion 1 and belts 2 and 3, a flywheel mass 4 with the driving shaft or capstan 5 for the record carrier and an idler wheel 6 for the driving of the wheel 7 for the turntable of a supply reel which in this apparatus is located on the right. The driving wheel 8 for the turntable of a take-up reel is driven through an idler wheel 9 by a driving wheel formed by a stage of the flywheel mass 4. The idler wheel 9 consists of two discs which, with the interposition of a lining consisting of friction material, are resiliently forced against each other. One disc actuates the driving wheel 8, the other the driving wheel 10. The driving of the wheel 8 is consequently effected through a friction clutch. A pressure roller 11 keeps the records carrier in contact with the driving shaft or capstan 5 during "forward at normal tape speed."

As operating members for the switching of the operating conditions, keys are provided, key 12 serving for switching "forward at normal tape speed" and "play," key 13 for switching "rewind" and a key (not shown) for switching the amplifier to "record." When depressing the keys they snap into engagement in a common holding member indicated by the broken line 15. When operating one key it will decouple in known manner keys which are already coupled. The stop key 14 only decouples the other keys through the holding member 15 without snapping into engagement.

The displacement of the component parts which is necessary for obtaining the two operating conditions "forward at normal tape speed" and "tape rewind" is effected through the intermediate member 16. It consists of a plate which is connected to the armature of an electromagnet 18 so that this plate is journalled in a slidable and swingable manner. Two springs 19 determine its intermediate position. The intermediate member 16 is connected to the keys 12 and 13 so that, by operating the key 12 it is swung out of the intermediate position into the one direction and by operating the key 13 it is swung into the other direction. For that purpose, the pivotable levers 20 and 21 respectively are provided with pins 22 and 23 respectively which are slidable in grooves 24 and 25 respectively of the plate 16. The levers 20 and 21 respectively are connected to the keys 12 and 13 respectively through draw-bars 26 and 27 respectively which are drawn into the direction of the arrows 28 and 29 respectively by operating the keys. The height of lift of the key and the length of the grooves 24 and 25 are matched so that when operating the keys no mutual interference of operation occurs.

For switching "forward at normal tape speed" the pressure roller 11 and the idler wheel 9 must be displaced, for switching "rewind" the idler wheel 6. In most cases brakes provided at the driving wheels 7 and 8 must be released. The bars 30 and 31 which are provided for releasing the brakes and are pivotably connected to a bell-crank lever 33 swingable around the pivot 32 are shown only diagrammatically.

The displacement of the pressure roller 11 and of the idler wheel 9 by the intermediate member 16 is produced by a pin 34, the displacement of the idler wheel 6 by a pin 35, both pins extending in an aperture 39 of the plate 16. For the transmission of a movement from the pins 34 and 35 to component parts to be displaced, these pins are connected to one limb of each bellcrank lever 36 and 37 respectively which can be swung around the pivot 38. The other end of the lever 36 is connected through a bar 40 to the lever 41 of the pressure roller 11 and to the lever 42 which operates a slide of the idler wheel 9. The other end of the lever 37 is connected to a lever 44 which carries the idler wheel 6. Through these transmission members, a movement of the pin 34 to the left puts the pressure roller 11 and the driving wheel 8 into operation, a movement of the pin 35 to the left causes the driving of the wheel 7. The aperture 39 is shaped so that, in accordance with the fact which of the two swung positions was selected for the intermediate member 16 by operating the keys 12 or 13, if the intermediate member is moved to the left by the attraction of the armature 17 of the magnet 18, either only the pin 34 or only the pin 35 is taken along. So in accordance with the choice made: either "forward" or "rewind" of the record carrier is switched. Since the brakes 30, 31 have to be released in both operating conditions, the lever 33 is directly connected to the intermediate member, namely to the bearing for swinging which remains in the rest position during the choice of the operating condition by operating the keys.

The electromagnet 18 serves as energy source which supplies the energy for displacing the component parts of the apparatus. The effective connection with the intermediate member 16 is made as soon as the make contact 45 which is connected, in series with the current source 46, in the current circuit of the magnet 18, is closed. While moving in the longitudinal direction, the intermediate member 16 follows the movement of the armature 17 thereby transmitting the displacement force to the component parts and the transmission members thereof respectively to be displaced. The contact 45 is provided so as to be closed both when operating the key 12 and key 13. Of course, instead two parallel contacts may be provided, of which each time one is associated with a key. It presents no difficulties to provide the contact 45 so that the current circuit is closed only when the swinging of the intermediate member 16 by operating either of the keys 12 or 13 is already completed, as a result of which consequently the effective connection between the energy source and the component parts to be displaced is made only after the choice of the operating condition has been made.

For switching off an operating condition switched in, it is necessary only, by operating the stop key 14, to decouple the key held by the holding member 15.

The apparatus shown in FIG. 2 in principle again uses the device shown in FIG. 1 but differs in a number of details from which new advantages appear. In as far as the component parts in FIGS. 1 and 2 have the same functions, they are indicated by the same reference numerals. Their provision and the function consequently are not described again since the new measures are expressed much more clearly already by bringing forward differences.

In addition to the keys 12 and 13 for switching "forward at normal tape speed" and "rewind," another key 47 for switching from "play" to "record" is provided which, as well as the keys 12 and 13, snaps into engagement with the holding means and also a so-called quick-stop key 48 which serves for instantaneously interrupting temporarily the forward travel of the tape. This key is independent of the holding means 15. If desired it may be constructed with an own mechanism so that when depressing the key for the first time it remains in the depressed position and when depressing it again it decouples again.

The rewind key 13 has no mechanical connection with the intermediate member 16 but has only the contact 45 with which the current circuit of the magnet 18 is closed if "rewind" has to be switched on. A break contact 49 is also connected in the current circuit and is opened by operating the quick-stop key 48. The meaning of the device indicated in the diagram of the current circuit by 50 will be explained afterwards.

The intermediate member 16 is connected to the key 12 for switching on the "forward at normal tape speed" through a pawl mechanism 58, 59 which is decoupled when the effective connection is made between the intermediate member 16 and the magnet 18. For that purpose the intermediate member 16 comprises an approximately square aperture 51 in which a pin 52 engages which is provided on a lever 54 provided with a spring 53, which lever in turn is coupled to a lever 55. The intermediate member 16 is pulled into the one swung position by a spring 56 which position corresponds to "rewind." Viewed from the magnet 18 the pin 52 is located on the front and the right hand side of the aperture 51. Consequently if the lever 54 is moved, the pin 52 may take along the intermediate member 16 while swinging it and is in turn taken along by the intermediate member 16 if the armature 17 is attracted by the magnet 18. The lever 57 which is swung if the key 12 is operated, is provided with a hook 58 with which an additional pin 59 provided on the lever 54 is caught. Consequently, as was the case in the device shown in FIG. 1, if the key 12 is operated the intermediate member 16 is swung and then moved in its longitudinal direction. However, in this case the pin 59 is detached from the hook 58. This has the advantage that the intermediate member 16 is freely movable now independent of the instantaneous depressed condition of the key 12. By means of an inclined face of the hook 58 this hook again engages behind the pin 59 when the key 12 is decoupled, so that the key is ready again for being switched on again.

In this case it is ensured that the pin 34 and the intermediate member 16 after completion of the sliding movement also hold each other as a kind of pawl mechanism because in the aperture 39 at the point where the edge of said aperture engages the pin 34 when the intermediate member is moved to the left, a suitable excavation is provided. Naturally, in this case also a possibility of decoupling should exist. In the example shown the decoupling of this connection is always effected when the magnet 18 passes no more current, so for example, by operating the stop key 14 when the key 12 snapped into engagement with the holding means is decoupled.

Through an extension 60 provided on the lever 55 a connection is made with the lever 33 which can be decoupled, by swinging of which the breaks 30, 31 are released. In this manner the brakes are connected both to the operating member for switching the operating condition chosen and to the intermediate member. They are mechanically released by operating the key 12 and are kept released by the armature 17 after it has been attracted. The energy for releasing the brakes must in this case be given to the key 12. Since this energy need not be very large, however, the additional force of the key 12 may remain very small.

Figure 2:
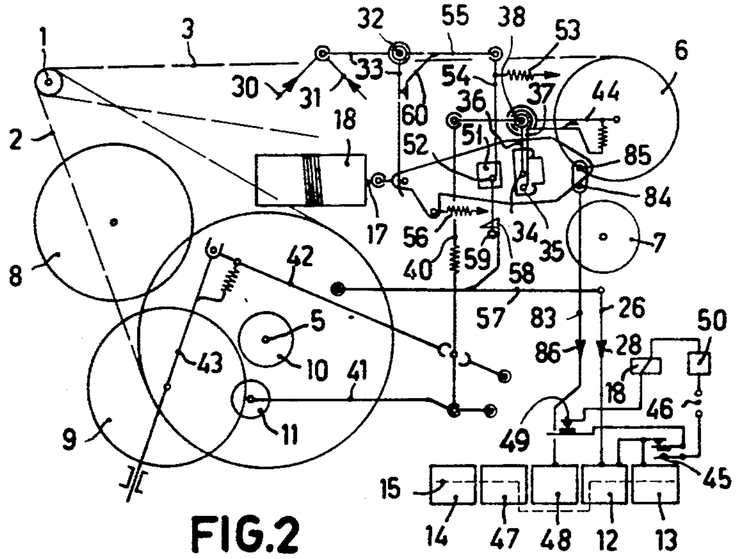
FIG. 2 shows an elaboration of the embodiment shown in FIG. 1, which is provided with a so-called quick-stop key and an automatic switching from forward to rewind.

It is a particular advantage of the device shown in FIG. 2 that no mechanical connection whatever between the operating member for "rewind," the key 12 and the intermediate member 16 is necessary for switching on "rewind." For switching on "rewind" it is sufficient for the contact 45 to be closed. This can be effected only by operating the key 12. Since the rest condition of the intermediate member 16 determined by the spring 56 corresponds to one of the two swung positions to be assumed during operation, namely to the swung position for "rewind," the apparatus may consequently be further constructed so that a separate key for switching on "rewind" is superfluous, that consequently only one key is present for switching on the apparatus, after operation of which key the forward travel of the record carrier starts until a point which is determined by a mark on the tape, after which, automatically, "rewind" is switched on which may be discontinued by decoupling that one key by means of the stop key. This is effected by means of the device indicated in the current circuit diagram of FIG. 2 by 50 which is operated by means of a mark on the record carrier and interrupts the current circuit of the magnet 18 for a short period of time. In its simplest form it consists of two parallel-arranged break-before-make contacts arranged behind each other, for example, in the direction of the forward travel of the sound carrier, the first of said contacts, a break contact, being opened at first by a mark, for example a thickening, on the record carrier and the second contact, a break contact, being closed thereafter by the same thickening. It is noted that it is assumed that the tape, after switching off the driving of the take-up reel, still continues travelling in the forward direction through a short length of tape as a result of the mass moment of inertia of that reel and the turntable with driving wheel 8 thereof. Since in the case of an interruption of current the intermediate member returns to the swung position necessary for rewinding under the action of the spring 56, rewinding starts again immediately after the short interruption when the current is switched on again by the second contact. The contacts which have changed their switched position when the mark passes, are now passed by the mark in the opposite direction. That in this case the current is again interrupted by opening the second contact is not disturbing because a change of position of the intermediate member 16 does not take place. However, it is difficult to match the whole device so that the mark entirely passes the contacts on rewinding. For, if this is not the case rewinding stops. There exist various possibilities to mitigate this drawback. Instead of the above-mentioned two break-before-make contacts, another device should be provided for interrupting the supply current of the magnet 18.

Figure 3:
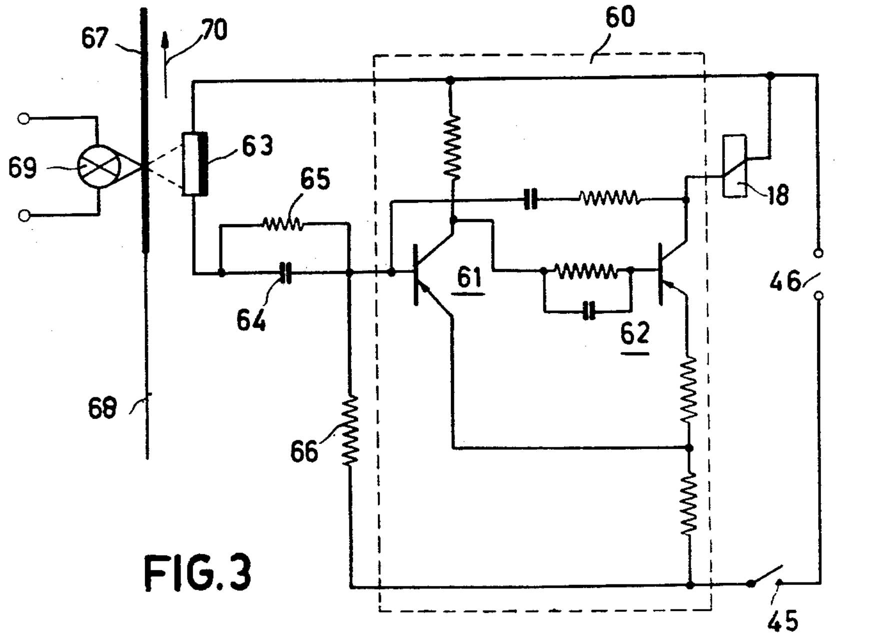
FIG. 3 shows a circuit diagram belonging to FIG. 2.

FIG. 3 shows the circuit diagram for such an arrangement, in which the transition from a light-impervious magnetic tape into a light-pervious terminal tape extension is used. The electromagnet 18 is connected in the output current circuit of a multivibrator 60 which is built up by means of two transistors 61 and 62. Naturally, other amplifier elements may be used also. If the transistor 61 is conductive, the transistor 62 is non-conductive, and conversely. The base of the first transistor 61 is supplied through a voltage divider which is constituted by the light-sensitive resistor 63, and RC-network, consisting of the parallel arrangement of a capacitor 64 with a high-ohmic resistor 65, and by a constant resistor 66. The light-impervious magnetic tape is indicated by 67 and a light-pervious terminal extension by 68. A light source 69 which constantly emits light is provided so that the magnetic tape 67 and the terminal extension 68 respectively pass between the source and the resistor 63. The values of the resistors in the voltage divider are chosen so that the first transistor 61 is non-conductive as long as the resistor 63 is high-ohmic, so as long as the light source is covered by the magnetic tape. This is the case both in forward and reverse travel of the record carrier. During this period the transistor 62 is conductive and current flows through the magnet 18 if the contact 45 which is switched by the key 12 (FIG. 2) is closed. If at the end of the forward travel, the direction of which is indicated by the arrow 70, the transparent terminal extension 68 becomes located in front of the resistor 63 the latter obtains a low resistance. As a result of the current pulse through the capacitor 64, the potential at the base of the transistor 61 instantaneously is varied so that the multivibrator flips over and the transistor 62 becomes non-conductive and the magnet 18 passes no current. The intermediate member 16 passes into the swung position for rewind under the action of the spring 56. This potential distribution, however, does not last long since the charge of the capacitor 64 flows away through the resistor 65. Then substantially only the resistance value of the resistor 65 is decisive of the potential distribution and in spite of the illumination of the resistor 63 the transistor 61 again becomes non-conductive and the multivibrator flips back into the starting position. The magnet 18 passes current again and rewinding begins. If then again the light-impervious magnetic tape 67 becomes located in front of the light source 69 and if the resistor becomes high-ohmic, this does not vary the switched position.

Figure 4:
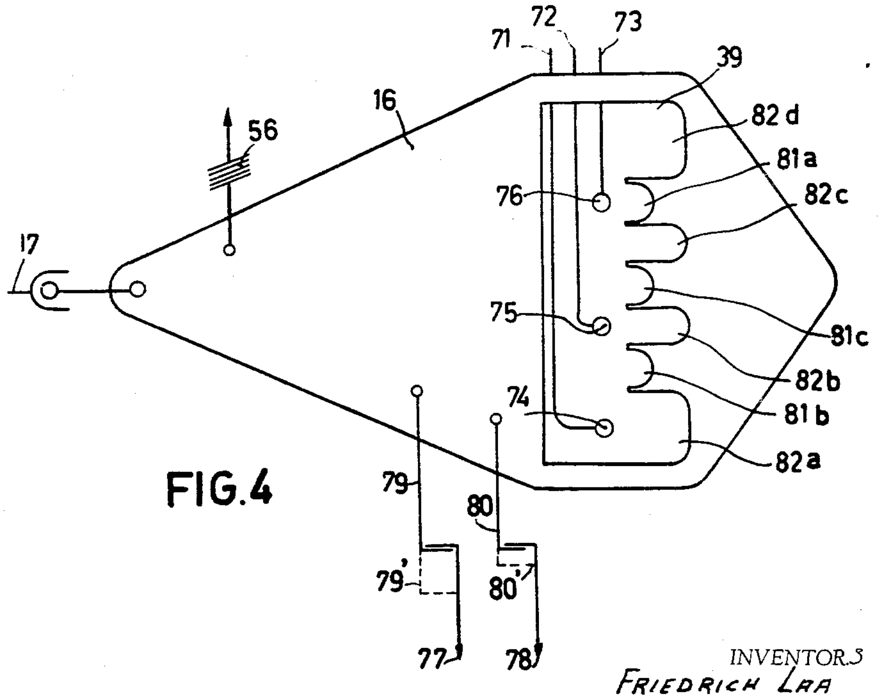
FIG. 4 shows on an exaggerated scale an intermediate member of a modified construction which may be used in a device shown in FIG. 1 of FIG. 2 for switching three operation conditions.

FIG. 4 shows an intermediate member 16 in which three transmission members 71, 72 and 73 for displacing movable component parts, for example for switching "forward at normal tape speed," "fast forward" and "rewind," extend into the aperture 39 with their pins 74, 75 and 76. The swinging for "forward at normal tape speed" and "fast forward" is effected by means of keys through draw-bars 77 and 78 which engage in hooks 79 and 80 provided on the intermediate member 16. The distances through which the hooks 79 and 80 are pulled forward—indicated by the dotted line positions 79' and 80'—are chosen differently large, namely in accordance with the shape of the right-hand side of the aperture 39 which, when moving the intermediate member 16 to the left by the attraction of the armature 17, becomes located against the pins 74, 75 and 76. This shaped side is shaped so that in accordance with the angular position of the intermediate member 16 it can act upon one of the pins only. In the position shown which is determined by the spring 56 it acts upon the pin 76 ("rewind") by means of the cavity 81*a*, which has only a small depth. In this case the pins 74 and 75 can move freely in two of the deeper cavities 82*a* and 82*b* respectively. If by operation of the bar 77 the intermediate member is swung to its maximum angular extent, the pin 74 becomes located in front of the less deep cavity 81*b*, the pins 75 and 76 can move freely again in the deeper cavities 82*c* and *d* respectively ("forward at normal tape speed"). If the intermediate member is swung into the central position by means of the bar 78, the pin 75 becomes operative in the cavity 81*c* and the pins 74 and 76 can move freely in the deeper cavities 82*a* and 82*d* respectively ("fast forward").

It is noted that the function of the intermediate member as explained with reference to FIGS. 1 to 3 is not restricted to the fact whether an aperture 39 is available in which pins engage which are provided on the transmission members of the movable component parts of the apparatus. As a matter of fact, the transmission members may always be provided so that followers provided on the intermediate member upon swinging of same assume a position with respect to these transmission members such that when moving the intermediate member to the left only that transmission member is influenced which is necessary for the switching of the operating condition chosen.

It is pointed out in addition that the sliding and swinging of the intermediate member may be varied so that the choice of the operating condition is made by a sliding movement and that in the subsequent swinging movement of the intermediate member the effective connection is made between the energy source and the transmission member.

The operation of the quick-stop key provided in the apparatus shown in FIG. 2 operates as follows. As may be seen from the drawing, the quick-stop key 48 is connected to a pin 85 of the intermediate member 16 through a switching bar 83 the end of which is provided with a longitudinal groove 84. On operating the key 48, this switching bar 83 moves in the direction of the arrow 86 and the break contact 49 is opened. If "forward at normal tape speed" was switched, the intermediate member 16 was swung. The pin 34 which serves for switching the pressure roller 11 is located, as a result of the movement of the intermediate member to the left, in the upper cavity of the aperture 39. If the quick-stop key is depressed, the intermediate member 16 returns to the right, the pin 34 can follow, the pressure roller 11 is lifted from the driving shaft 5 and the tape stops instantaneously, since also the brakes 30 and 31 are operated through the lever 33. The intermediate member 16, however, is maintained in its swung position by the switching rod 83 so that, when closing the current circuit again by releasing the stop key 48 the interrupted operating condition, in the present case "forward at normal tape speed," is again switched on by the contact 49.

In the devices shown in FIGS. 5 to 16 a comb 90 is provided as intermediate member which is pivotable about its longitudinal shaft 91. In the example shown in FIGS. 5 to 15 the comb 90 comprises six teeth indicated by reference number 92 all extending in the same direction, the single tooth indicated by 93 points in the opposite direction. Four operating conditions have to be switched, namely "forward at normal tape speed," "fast forward," "fast rewind" and "record." For stopping the travel of the tape after the supply of tape has been used, an automatic stop has been provided. As operating members for switching the operating conditions four swingable keys 94 are used. Depressed keys snap into engagement in hooks 95 of a latch 98 pivotable about the shaft 96 against the action of the spring 97 (FIGS. 6 and 7). For this purpose, every key 94 comprises a cross beam 99 in its hollow key body. Under the stop key 100 such a hook 95 is not available at the latch 98. At this point said key comprises a full profile which is indicated in FIG. 6 by a broken line. The stop key 100 consequently does not snap into engagement but decouples the keys which are already depressed.

The component parts to be displaced are displaced through slidable transmission members 101 which are pivoted or bent when the keys 94 are depressed. As a result of this members 101 are engaged by the teeth of the comb 92 and when the comb is pivoted in the direction of the arrow 103 (FIG. 7) members 101 are shifted against springs 102, thereby exerting the required displacement force on the component parts to be displaced. The transmission members 101 are maintained in the final position obtained in this manner because the pivotal brace 105 pulled down by a spring 104 snaps into engagement in the catches or lugs 106 provided on the transmission members 101.

The displacement force via the comb is supplied by the flywheel mass 107 (FIG. 8). In order to bring that mass into engagement with the intermediate member 90, the latter comprises a downwardly bent lever 108 connected to the tooth 93. The flywheel mass 107 is provided with a spiral groove 109 the radius of which increases in the direction of rotation of the flywheel mass indicated by the arrow 110 (FIG. 5). If, when the flywheel mass 107 rotates, the lever 108 is pressed into the beginning of the spiral groove 109 against the action of the spring 111, said lever, on traversing the groove 109, rotates the tooth 93 of the comb and consequently one of the teeth 92 bearing against an associated transmission member 101 if the associated operating key 94 is depressed (FIGS. 7 and 8). The ends 112 of the groove 109 terminates flat on the surface of the flywheel mass 107, so that the lever 108 is lifted again if the groove is traversed. A displaced transmission member 101, however, remains in its switched position because the brace 105 is snapped into engagement with a lug 106 as described above.

The movement of the lever 108 into the groove 109 is effected by the armature 113 of the magnet 114. For this purpose, a small inexpensive magnet is sufficient because only a small force is required for attracting the armature. The current circuit of this magnet 114 is shown in FIG. 16. For switching on the current source 115 make-contacts 116 and 117 are provided which are closed when the keys 94 are depressed. The break contacts 119 and 120 which are opened only by the movement of the transmission members 101 are still closed. The contacts 119 and 120 associated with the individual transmission members are connected in parallel. The same is the case with the keys unless common contacts are preferred which are switched by auxiliary members controlled by the keys and the transmission members respectively. Now the device supplies a current pulse to the magnet 114. In order that the lever 108 remains in the groove when traversing the same, its end 123 forms a hook with which it is held in a recess 124 of the groove. This recess 124 is not present at the beginning and at the end of the groove, so that the lever 108 remains freely movable at these points.

The further component parts shown in the diagram, the magnet 125, the two contacts 126 across which the record carrier travels, as well as the contacts 118, 121 and 122 belong to the device for automatically stopping the travel of the tape and will be explained hereinafter. In order that the transmission member 101 which is held in the pawl 105 is decoupled when the stop key 100 for stopping an operating condition is operated, an extension 141 is provided at the stop key 100 (FIG. 5) with which the brace 105 is lifted.

For the automatic stop key (FIG. 14) a bendable lever 127 is provided which is constructed in the same manner as the transmission members 101 for being brought into the area of the comb 92 associated with it. It extends through the aperture 128 of a pivoted lever 129 and, if this lever is depressed, it is pushed down at any rate against the tension of the spring 130 and brought into the area of the tooth 92. This occurs when the magnet 125 is energized. This is the case then when the two contacts 126 (FIG. 16) across which the record carrier travels, are bridged temporarily by a short conductive layer provided on the record carrier which in itself is non-conductive. For this purpose also the contact 118 (FIGS. 6 and 7) is necessary which is constructed so that it follows the contacts 117 when a key 94 is depressed. When the lever 129 is depressed, the magnet 114 which did not pass current as a result of the interruption of the contacts 119 and 120 again passes current because also the make-contact 121, 122 is closed with the lever 129. The intermediate member is coupled to the flywheel mass 107 as energy source and the lever 127 is moved, the pawl 105 is decoupled by means of the catch 131 provided at the lever 127 and the transmission member 101 switched in at that moment returns to the rest condition. At the same time the key also is released because an extension 132 is provided at the latch 98 below the lever 129 on which extension the lever 129 engages when being depressed. The two magnets 114 and 125 again pass no current after decoupling of the keys.

FIGS. 9 and 10 show a variation of the device shown in FIG. 5. In this case the keys 94 for switching the various operating conditions are replaced by levers 133 which are swung by magnets 134. That for each operating condition such a magnet is required is unimportant since these magnets need supply only very little power and can consequently be constructed very small and very cheap. Therefore, this device is excellently suitable for remote control. As a selector switch for choosing the operating conditions, for example, a rotary switch may be provided in the remote control unit.

A further variation of the device shown in FIG. 5 is shown in FIGS. 11, 12 and 13. The connection of the comb 90 serving as intermediate member and the rotating flywheel mass 107 respectively is in this case effected entirely mechanically without the use of a magnet. The keys 94 of this device differ from those shown in FIGS. 5, 6 and 7 only by a catch 135. With this catch 135 a pivotable plate 136 is swung which is provided with a bent portion which plate is located below the keys for switching the operating conditions. At right angles to the plate 136 at its pivot, a lever 137 is connected to the plate 136 in a manner such that it becomes located over the lever 108 (FIG. 13) which is connected to the tooth 93 of the intermediate member 90 and swings the latter when it engages in the groove 109 of the flywheel mass 107. The catches 135 of the keys 94 swing the plate 136 through the bent portion thereof both when depressing into the snapped position and when it is raised after decoupling. Each time the lever 137 is lifted, thereby swinging the bell-crank lever 138 which is connected to the lever 108 via a pressure spring 139. This is tensioned and consequently forces the lever 108 into the groove 109 as soon as the beginning thereof passes the free end of the lever. As in the device shown in FIG. 7, the lever 108 is moved outwards, thus swinging the intermediate member 90. The further operation, the movement of the transmission members 101 for switching the operating conditions and the snapping into engagement of these transmission members 101 into the brace 105, is effected entirely the same as was already described with reference to FIGS. 5 and 6. By moving the lever 108 to the right, however, the pressure spring 139 is released again. At the same time, the tension spring 140 provided at the lever 108 is tensioned to such an extent that its tension surpasses the action of the spring 139, after which the lever 108, after traversing the groove 109, is lifted into the rest position limited by a stop member.

In the same manner the comb 90 is made operative with the automatic stop (FIG. 15). The device shown in FIG. 15 differs from the device shown in FIG. 14 only in that the make contact 121, 122 fails. The current circuit of the electromagnet 125 comprises, in addition to a current source, only the contacts 126 (FIG. 16) which are covered by the non-conductive record carrier and are temporarily closed by a conductive mark provided on said carrier. If the magnet 125 pulls the lever 129 downwards when the current circuit is closed, it decouples again the key 94 snapped at that instant by pressure on the extension 132 of the latch 98. When this key is raised however, it swings the plate 136 and the intermediate member 90, as was already described, is connected to the flywheel mass 107, moves the lever 127, thereby decoupling the brace 105 and the transmission member 101 snapped into engagement at that instant.

It goes without saying that many variations of the two embodiments of the intermediate member described in detail are possible without leaving the idea of this invention. Neither the one nor the other form is restricted to the fact that for the supply exactly the energy of a current source through an electromagnet or the energy of a rotating mass is used. In the embodiment shown in FIG. 5, the movement of the intermediate member 90 may be effected by an electromagnet; the movement also of an intermediate member 16 as shown in FIGS. 1, 2 and 3 may also be effected by the flywheel mass.

What is claimed is:

1. In a tape recorder/reproducer having movable component means including a brake and a pressure roller for establishing the operating conditions of the recorder/reproducer, the improvement comprising; a plurality of manually operated keys for selecting each of said operating conditions, an intermediate member, transmission means coupled with said intermediate member and the movable component means of said recorder/reproducer, means linking said intermediate member and at least one of said manually operated keys for imparting a first movement to said intermediate member upon movement of said operating key, an energy source and means for coupling said energy source and said intermediate member for imparting a second movement to said intermediate member and associated transmission means for moving said movable component means into an operating condition of said recorder/reproducer.

2. In a tape recorder/reproducer having movable component means including a brake and a pressure roller for establishing the operating conditions of the recorder/reproducer, the improvement comprising; a plurality of manually operated keys for selecting each of said operating conditions, an intermediate member, transmission means including means for selectively coupling said intermediate member and said transmission means, said transmission means being connected with the movable component means of said recorder/reproducer, means linking said intermediate member and at least one of said manually operated keys for imparting a first movement to said intermediate member upon movement of said operating key for selecting at least one of said transmission means and the associated movable component, an energy source and means for coupling said energy source and said intermediate member for imparting a second movement to said intermediate member and only the selected transmission means for moving said movable component means associated with the selected transmission means into an operating condition of said recorder/reproducer.

3. In a tape recorder/reproducer according to claim 2 wherein said intermediate member comprises a lever, means for pivotally and slidably supporting said lever; and with the addition of a pawl means interconnecting said lever and the associated operating key, and means for decoupling said pawl when said lever is given its second movement.

4. In a tape recorder/reproducer according to claim 1 wherein said intermediate member comprises a comb-like part pivotal about its longitudinal axis and in which the comb teeth extend in one direction from the axis about which said comb pivots, at least one other tooth extending in the opposite direction, and means connected with said one tooth for coupling said comb with said energy source.

5. In a tape recorder/reproducer according to claim 1 wherein said energy source comprises an electromagnet and said means for coupling said energy source and said intermediate member comprises an armature connected with said intermediate member.

6. In a tape recorder/reproducer according to claim 4 wherein said energy source is a flywheel and said means connected with said one tooth for coupling said comb and said flywheel comprises a helical groove in said flywheel and a pivotal lever, one end of said lever fitting in said groove for imparting movement to said comb.

7. In a tape recorder/reproducer having a movable component means including a brake and a pressure roller for establishing at least one of the operating conditions of the recorder/reproducer, the improvement comprising; a manually operated key for selecting the said operating condition, an intermediate member, means coupling said intermediate member and said key, transmission means coupled with said component means for moving said component means, means for selectively coupling said intermediate member and said transmission means, an energy source, and means for coupling said energy source and said intermediate member for moving said selected transmission means for establishing the operating condition chosen by manual operation of said key.

8. In a tape recorder/reproducer having movable component means including a brake and a pressure roller for establishing an operating condition of the recorder/reproducer, the improvement comprising; a manually operated key means for selecting the recorder/reproducer operation, a transmission member coupled with said movable component means, an intermediate member and means for removably coupling said intermediate member and said transmission member; said transmission member being engaged by said key for movement into engagement with said intermediate member, means for latching said key in engagement with said transmission member, said intermediate member comprising a comb-like part having a shaft for pivotally supporting said comb-like part, said transmission member engaging one tooth of said comb-like part, an armature connected with another tooth of said comb-like part and having a cam follower portion, a flywheel energy source having a helical groove formed in the surface thereof adjacent said cam follower portion, electric circuit means including a magnet for moving said armature and engaging the cam follower in the said groove whereby said flywheel energy source moves said transmission member; and means on said key for closing said circuit at a determined time relative to coupling of said transmission member and said comb-like part.

9. In a tape recorder/reproducer having a capstan and movable component means including a brake and pressure roller for establishing an operating condition and a plurality of manually operable keys for selecting an operating condition; the improvement comprising, a slidably movable transmission member connected with said component means, a comb-like intermediate member, means for pivotally mounting said comb-like member, an energy source and means for connecting said energy source and said comb-like member for imparting pivotal movement thereto, and means operatively associated with said means for connecting said energy source and said comb-like member for removably coupling said intermediate member and said comb-like member for moving said intermediate member and the associated component means.

10. In a tape recorder/reproducer according to claim 9 wherein said energy source is the flywheel of the tape capstan of said recorder/reproducer and said means connecting said comb-like member and said energy source comprises, an armature pivotally connected to said comb-like member and an electromagnet coupled with said armature, said flywheel having a helical groove for receiving a portion of said armature for pivoting said comb-like member.

11. In a tape recorder/reproducer according to claim 10 wherein said means operatively associated with said first-named means comprises a key in juxtaposition with said transmission member, electric contact means coupled with said key and said electromagnet, said key having a tab for engaging said transmission member and moving it into the path of movement of said comb-like member, said key being dimensioned and arranged for sequentially energizing said electromagnet and moving said transmission member.

12. In a tape recorder/reproducer according to claim 11 with the addition of a pivotal brace means coupled with said transmission member for locking said transmission member in the position established by said comb-like member and decoupling means for releasing said pivotal brace.

13. In a tape recorder/reproducer according to claim 9 wherein said energy source is the flywheel of the tape capstan of said recorder/reproducer and said means connecting said comb-like member and said energy source comprises a lever pivotally connected with said comb-like member at one end and having a foot portion receivable in a helical groove of said flywheel, toggle spring means for pivoting said lever for placing said foot portion in said groove, and further lever means coupled with said toggle spring means and also with said key for connecting said energy source and said comb-like member.

References Cited by the Examiner

UNITED STATES PATENTS

| | | | |
|---|---|---|---|
| 2,931,237 | 4/1960 | Backus | 74—335 |
| 3,074,291 | 1/1963 | Alfieri | 74—335 |

DAVID J. WILLIAMOWSKY, *Primary Examiner.*

H. S. LAYTON, *Assistant Examiner.*